United States Patent
Moriyama et al.

(10) Patent No.: US 9,890,853 B2
(45) Date of Patent: Feb. 13, 2018

(54) HYDRAULIC CONTROL DEVICE OF CONTINUOUSLY VARIABLE TRANSMISSION FOR VEHICLE

(71) Applicant: TOYOTA JIDOSHA KABUSHIKI KAISHA, Toyota-shi, Aichi (JP)

(72) Inventors: Shuji Moriyama, Nagakute (JP); Yoshinobu Soga, Toyota (JP); Yoshihiro Mizuno, Nagoya (JP); Hiromitsu Nitani, Nagakute (JP); Takafumi Inagaki, Toyota (JP); Kenichi Tsuchida, Anjo (JP); Toshiaki Hayashi, Anjo (JP); Yuta Seriguchi, Anjo (JP); Masafumi Takasu, Anjo (JP); Yoichiro Kimura, Anjo (JP); Masashi Takizawa, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/212,953

(22) Filed: Jul. 18, 2016

(65) Prior Publication Data
US 2017/0016530 A1 Jan. 19, 2017

(30) Foreign Application Priority Data
Jul. 16, 2015 (JP) .................................. 2015-142515

(51) Int. Cl.
*F16H 9/12* (2006.01)
*F16H 59/00* (2006.01)
(Continued)

(52) U.S. Cl.
CPC ............... *F16H 61/12* (2013.01); *F16H 9/18* (2013.01); *F16H 61/662* (2013.01);
(Continued)

(58) Field of Classification Search
CPC ............... F16H 61/66272; F16H 61/12; F16H 61/66259; F16H 61/662; Y10T 477/624
(Continued)

(56) References Cited

U.S. PATENT DOCUMENTS

| 4,669,336 A | * | 6/1987 | Okada ................... | B60W 30/18 474/28 |
| 6,129,188 A | * | 10/2000 | Friedmann ............ | F16D 25/123 192/113.34 |

(Continued)

FOREIGN PATENT DOCUMENTS

JP 2013-160379 A 8/2013

*Primary Examiner* — Henry Y Liu
(74) *Attorney, Agent, or Firm* — Oliff PLC (57) ABSTRACT

A hydraulic control device has: a modulator valve using oil pressure from a hydraulic source for adjusting a modulator pressure; driving and driven-side hydraulic actuator control valves controlling hydraulic oil from the source to driving and driven-side hydraulic actuators; a driving-side control oil pressure adjusting electromagnetic valve using the modulator pressure for outputting a control oil pressure controlling the driving-side control valve; and a driven-side control oil pressure adjusting electromagnetic valve for outputting a control oil pressure controlling the driven-side control valve, the hydraulic control device including a failsafe valve switched from a normal to a failure position based on a failure disabling electric control for the driving-side and driven-side electromagnetic valves, the modulator valve making the modulator pressure lower than a value at the normal position based on an output switching pressure generated due to switching the failsafe valve from the normal to the failure position.

12 Claims, 4 Drawing Sheets

(51) Int. Cl.
   *F16H 61/00*  (2006.01)
   *F16H 63/00*  (2006.01)
   *F16H 61/12*  (2010.01)
   *F16H 61/662* (2006.01)
   *F16H 9/18*   (2006.01)

(52) U.S. Cl.
   CPC ............... *F16H 2061/1252* (2013.01); *F16H 2061/1264* (2013.01); *F16H 2061/1268* (2013.01)

(58) Field of Classification Search
   USPC .......................................................... 474/28
   See application file for complete search history.

(56) References Cited

U.S. PATENT DOCUMENTS

| Patent/Pub No. | Date | Inventor | Classification | Subclass |
|---|---|---|---|---|
| 6,299,564 B1* | 10/2001 | Gessler | F16H 61/66272 | 474/28 |
| 6,306,061 B1* | 10/2001 | Inamura | F16H 61/14 | 477/45 |
| 6,338,695 B1* | 1/2002 | Aoki | B60K 6/405 | 477/160 |
| 6,443,871 B2* | 9/2002 | Taniguchi | F16H 61/66272 | 474/70 |
| 6,527,668 B2* | 3/2003 | Vorndran | F16H 57/0413 | 474/28 |
| 8,012,051 B2* | 9/2011 | Soga | F16H 61/12 | 474/110 |
| 8,062,156 B2* | 11/2011 | Nishida | F16H 61/66272 | 474/18 |
| 8,146,723 B2* | 4/2012 | Harada | B63H 21/213 | 192/3.58 |
| 8,781,674 B2* | 7/2014 | Iraha | F16D 48/062 | 477/34 |
| 2002/0004436 A1* | 1/2002 | Vorndran | F16H 57/0413 | 475/91 |
| 2004/0176198 A1* | 9/2004 | Nobu | F16H 61/14 | 474/28 |
| 2005/0107195 A1* | 5/2005 | Katou | F16H 63/065 | 474/28 |
| 2005/0197221 A1* | 9/2005 | Nozawa | F16H 55/56 | 474/18 |
| 2005/0221929 A1* | 10/2005 | Oshita | B60W 10/06 | 474/28 |
| 2005/0221930 A1* | 10/2005 | Oshita | F16H 61/12 | 474/28 |
| 2006/0058129 A1* | 3/2006 | Kim | F16H 61/66254 | 474/18 |
| 2006/0073924 A1* | 4/2006 | Izumi | F16H 61/66254 | 474/28 |
| 2006/0111208 A1* | 5/2006 | Hiramatsu | F16H 55/56 | 474/28 |
| 2006/0150762 A1* | 7/2006 | Petrzik | F16H 61/12 | 74/346 |
| 2006/0172829 A1* | 8/2006 | Ishio | F16H 61/0021 | 474/18 |
| 2007/0232424 A1* | 10/2007 | Nishida | F16H 61/66259 | 474/28 |
| 2007/0298918 A1* | 12/2007 | Toyoda | F16H 61/66259 | 474/28 |
| 2008/0004141 A1* | 1/2008 | Toyoda | F16H 61/0021 | 474/28 |
| 2008/0216471 A1* | 9/2008 | Staudinger | F15B 1/021 | 60/418 |
| 2009/0055061 A1* | 2/2009 | Zhu | B60K 6/48 | 701/55 |
| 2009/0069146 A1* | 3/2009 | Soga | F16H 61/12 | 476/3 |
| 2009/0076690 A1* | 3/2009 | Guo | B60K 6/12 | 701/51 |
| 2010/0151977 A1* | 6/2010 | Ogata | F16H 61/12 | 474/28 |
| 2011/0039646 A1* | 2/2011 | Willeke | F15B 13/0433 | 474/28 |
| 2011/0087397 A1* | 4/2011 | Iraha | F16H 61/12 | 701/31.4 |
| 2011/0155533 A1* | 6/2011 | Muller | F16D 48/0206 | 192/85.63 |
| 2012/0108374 A1* | 5/2012 | Doihara | F16H 61/66272 | 474/28 |
| 2012/0298469 A1* | 11/2012 | Nemeth | F16D 48/02 | 192/85.63 |
| 2013/0165282 A1* | 6/2013 | Hattori | F16H 9/125 | 474/28 |
| 2014/0357434 A1* | 12/2014 | Lundberg | F16H 9/125 | 474/28 |
| 2014/0371012 A1* | 12/2014 | Moriyama | F16H 61/00 | 474/28 |
| 2016/0305522 A1* | 10/2016 | Fukao | B60K 17/00 | |

* cited by examiner

FIG.4

HYDRAULIC CONTROL DEVICE OF CONTINUOUSLY VARIABLE TRANSMISSION FOR VEHICLE

INCORPORATION BY REFERENCE

The disclosure of Japanese Patent Application No. 2015-142515 filed on Jul. 16, 2015 including the specification, drawings and abstract is incorporated herein by reference in its entirety.

BACKGROUND OF THE INVENTION

1. Field of the Invention

The present invention relates to a hydraulic control device of a continuously variable transmission for a vehicle and is related to a technique of adjusting an oil pressure.

2. Description of the Related Art

In a vehicle including a continuously variable transmission having driving-side and driven-side pulleys and a belt wound around the both pulleys in a power transmission path between an engine acting as a power source for running and drive wheels, it is known that the driving-side pulley is provided with a driving-side hydraulic actuator for changing a groove width thereof while the driven-side pulley is provided with a driven-side hydraulic actuator for changing a groove width thereof, and a winding diameter (effective diameter) of the belt on each of the both pulleys is varied to make a shift in the continuously variable transmission in a hydraulic control device of a continuously variable transmission for a vehicle. For example, this corresponds to a hydraulic control device of a continuously variable transmission for a vehicle described in Japanese Laid-Open Patent Publication No. 2013-160379.

The hydraulic control device of the continuously variable transmission for the vehicle controls each of a normally-opened first electromagnetic valve disposed in a first oil passage between a hydraulic source and the driving-side hydraulic actuator and a normally-closed second electromagnetic valve disposed in a second oil passage between the hydraulic source and the driven-side hydraulic actuator, thereby properly maintaining a tension of a transmission belt wound around the driving-side pulley and the driven-side pulley and continuously varying the transmission. A third oil passage connected between the first oil passage and the second oil passage is provided with a pressure reducing means (an orifice) reducing a hydraulic oil pressure supplied from the first oil passage to the second oil passage and a normally-opened third electromagnetic valve. As a result, at the time of failure when the electromagnetic valves are all put into an OFF-state due to occurrence of a failure of an electric power source for hydraulic control, disconnection of a harness supplying a drive control signal from an electronic control device to the electromagnetic valves, or a failure of the electronic control device controlling the electromagnetic valves, the hydraulic oil from the hydraulic source is supplied through the first electromagnetic valve to a first hydraulic actuator, and the oil pressure of the hydraulic oil supplied to the first hydraulic actuator is reduced by the orifice and supplied through the third electromagnetic valve to the second oil passage and the driven-side hydraulic actuator, so as to ensure running of a vehicle at the time of failure (limp home running).

In the hydraulic control device of the continuously variable transmission for the vehicle of Japanese Laid-Open Patent Publication No. 2013-160379, the hydraulic oil pressure of the hydraulic source is supplied through the first and third electromagnetic valves put into an opened state to the driving-side hydraulic actuator and the driven-side hydraulic actuator at the time of failure when the electromagnetic valves are all turned off and, since the hydraulic oil pressure is reduced by the pressure reducing means and supplied to the second oil passage or a second hydraulic actuator, the second hydraulic actuator is prevented from being supplied with an excessive oil pressure at the time of failure. This eliminates the requirements for higher strength and improvement in ensuring rigidity of a fixed sheave and a movable sheave facing thereto and the increases in axial dimension and mass for ensuring the strength of the driving-side pulley and the driven-side pulley. However, since the third oil passage connected between the first oil passage and the second oil passage must be provided with the pressure reducing means (the orifice) reducing a hydraulic oil pressure supplied from the first oil passage to the second oil passage and the normally-opened third electromagnetic valve, a hydraulic circuit configuration is disadvantageously complicated so as to ensure running of a vehicle during failure.

SUMMARY OF THE INVENTION

The present invention was conceived in view of the situations and it is therefore an object of the present invention to provide a hydraulic control device of a continuously variable transmission for a vehicle without an increase in axial dimension and mass of the driving-side pulley and the driven-side pulley and without a complicated hydraulic circuit configuration.

Solution to Problem

To achieve the above object, a first aspect of the invention provides a hydraulic control device of a continuously variable transmission for a vehicle having (a) driving-side and driven-side pulleys disposed in a power transmission path between a power source for running and drive wheels, a belt wound around the both pulleys, a driving-side hydraulic actuator for changing a groove width of the driving-side pulley, and a driven-side hydraulic actuator for changing a groove width of the driven-side pulley, the hydraulic control device comprising: (b) a modulator valve using an oil pressure from a hydraulic source as a source pressure for adjusting a modulator pressure; a driving-side hydraulic actuator control valve controlling a hydraulic oil supplied from the hydraulic source to the driving-side hydraulic actuator; a driving-side control oil pressure adjusting electromagnetic valve of normally-opened type using the modulator pressure as a source pressure for outputting a control oil pressure controlling the driving-side hydraulic actuator control valve; a driven-side hydraulic actuator control valve controlling a hydraulic oil supplied from the hydraulic source to the driven-side hydraulic actuator; and a driven-side control oil pressure adjusting electromagnetic valve of normally-opened type using the modulator pressure as a source pressure for outputting a control oil pressure controlling the driven-side hydraulic actuator control valve, the hydraulic control device including (c) a failsafe valve switched from a normal position to a failure position based on an occurrence of a failure disabling electric control for the driving-side control oil pressure adjusting electromagnetic valve and the driven-side control oil pressure adjusting electromagnetic valve, (d) the modulator valve making the modulator pressure lower than a value at the normal position based on an output switching pressure generated due to switching of the failsafe valve from the normal position to the failure position.

A second aspect of the invention provides the hydraulic control device of a continuously variable transmission for a vehicle recited in the first aspect of the invention, wherein (e) the failsafe valve is a switching valve having a switching pressure port receiving as a switching pressure the control oil pressure output from the driving-side control oil pressure adjusting electromagnetic valve or the control oil pressure output from the driven-side control oil pressure adjusting electromagnetic valve, and being switched from the normal position to the failure position based on the control oil pressure received with the switching pressure port exceeding a preset pressure value.

A third aspect of the invention provides the hydraulic control device of a continuously variable transmission for a vehicle recited in the first or second aspect of the invention, wherein (f) the modulator valve has an input port connected to the hydraulic source, an output port, and an output pressure switching port receiving an output switching pressure for switching an amplitude of an output pressure output from the output port, outputs a constant first modulator pressure regardless of variations in oil pressure of the hydraulic source when the output switching pressure is not supplied to the output pressure switching port, and outputs a constant second modulator pressure lower than the first modulator pressure regardless of variations in oil pressure of the hydraulic source when the output switching pressure is supplied to the output pressure switching port, and wherein (g) when the failsafe valve is switched from the normal position to the failure position, the failsafe valve supplies as the output switching pressure the second modulator pressure output from the modulator valve to the output pressure switching port that has been drained.

A fourth aspect of the invention provides the hydraulic control device of a continuously variable transmission for a vehicle recited in the first or second aspect of the invention, wherein (h) the modulator valve has an input port connected to the hydraulic source, an output port, and an output pressure switching port receiving an output switching pressure for switching an amplitude of an output pressure output from the output port, outputs a constant first modulator pressure regardless of variations in oil pressure of the hydraulic source when the output switching pressure is supplied to the output pressure switching port, and outputs a constant second modulator pressure lower than the first modulator pressure regardless of variations in oil pressure of the hydraulic source when the output switching pressure is not supplied to the output pressure switching port, and wherein (i) when the failsafe valve is switched from the normal position to the failure position, the failsafe valve drains the first modulator pressure from the modulator valve that has been supplied to the output pressure switching port.

A fifth aspect of the invention provides the hydraulic control device of a continuously variable transmission for a vehicle recited in any one of the first to fourth aspects of the invention, comprising (j) a forward clutch engaged during forward running of the vehicle to transmit power output from the power source for running to the drive wheels, and a clutch pressure adjusting electromagnetic valve of normally-closed type using the modulator pressure as a source pressure for adjusting a clutch pressure supplied to the forward clutch, wherein (k) the failsafe valve supplies the clutch pressure output from the clutch pressure adjusting electromagnetic valve to the forward clutch at the normal position and supplies the modulator pressure output from the modulator valve to the forward clutch instead of the clutch pressure at the failure position.

Advantageous Effects of the Invention

The first aspect of the invention provides the hydraulic control device comprising: the modulator valve using the oil pressure from the hydraulic source as a source pressure for adjusting the modulator pressure; the driving-side hydraulic actuator control valve controlling a hydraulic oil pressure supplied from the hydraulic source to the driving-side hydraulic actuator; the driving-side control oil pressure adjusting electromagnetic valve of normally-opened type using the modulator pressure as a source pressure for outputting the control oil pressure controlling the driving-side hydraulic actuator control valve; the driven-side hydraulic actuator control valve controlling a hydraulic oil pressure supplied from the hydraulic source to the driven-side hydraulic actuator; and the driven-side control oil pressure adjusting electromagnetic valve of normally-opened type using the modulator pressure as a source pressure for outputting the control oil pressure controlling the driven-side hydraulic actuator control valve, the hydraulic control device including (c) the failsafe valve switched from the normal position to the failure position based on an occurrence of a failure disabling electric control for the driving-side control oil pressure adjusting electromagnetic valve and the driven-side control oil pressure adjusting electromagnetic valve, (d) the modulator valve making the modulator pressure lower than a value at the normal position based on the output switching pressure generated due to switching of the failsafe valve from the normal position to the failure position. As a result, even if the driving-side control oil pressure adjusting electromagnetic valve and the driven-side control oil pressure adjusting electromagnetic valve are put into the opened state in the failure state, since the modulator pressures that are the source pressures thereof are made low, it is not required to form a complicated hydraulic circuit configuration by adding a third electromagnetic valve and a pressure reducing means.

According to the second aspect of the invention, since the failsafe valve is the switching valve having the switching pressure port receiving as the switching pressure the control oil pressure output from the driving-side control oil pressure adjusting electromagnetic valve or the control oil pressure output from the driven-side control oil pressure adjusting electromagnetic valve, and being switched from the normal position to the failure position based on the control oil pressure received by the switching pressure port exceeding a preset pressure value, the failsafe valve can be switched from the normal position to the failure position without increasing circuit components such as an electromagnetic valve for switching to the failure position.

According to the third aspect of the invention, the modulator valve has the input port connected to the hydraulic source, the output port, and the output pressure switching port receiving the output switching pressure for switching an amplitude of the output pressure output from the output port, outputs the constant first modulator pressure regardless of variations in oil pressure of the hydraulic source when the output switching pressure is not supplied to the output pressure switching port, and outputs the constant second modulator pressure lower than the first modulator pressure regardless of variations in oil pressure of the hydraulic source when the output switching pressure is supplied to the output pressure switching port, and when the failsafe valve is switched from the normal position to the failure position, the failsafe valve supplies as the output switching pressure the modulator pressure output from the modulator valve to the output pressure switching port that has been drained. As a result, even if the driving-side control oil pressure adjusting electromagnetic valve and the driven-side control oil pressure adjusting electromagnetic valve are put into the opened state in the failure state, since the source pressures thereof are set to the constant second modulator pressure lower than the first modulator pressure, the driving-side pulley and the driven-side pulley are not increased in axial dimension and mass for higher strength or higher rigidity and it is not required to form a complicated hydraulic circuit configuration by adding a third electromagnetic valve and a restrictor.

According to the fourth aspect of the invention, the modulator valve has the input port connected to the hydraulic source, the output port, and the output pressure switching port receiving the output switching pressure for switching an amplitude of the output pressure output from the output port, outputs the constant first modulator pressure regardless of variations in oil pressure of the hydraulic source when the output switching pressure is supplied to the output pressure switching port, and outputs the constant second modulator pressure lower than the first modulator pressure regardless of variations in oil pressure of the hydraulic source when the output switching pressure is not supplied to the output pressure switching port, and when the failsafe valve is switched from the normal position to the failure position, the failsafe valve drains the first modulator pressure from the modulator valve that has been supplied to the output pressure switching port. As a result, even if the driving-side control oil pressure adjusting electromagnetic valve and the driven-side control oil pressure adjusting electromagnetic valve are put into the opened state in the failure state, since the source pressures thereof are set to the constant second modulator pressure lower than the first modulator pressure, the driving-side pulley and the driven-side pulley are not increased in axial dimension and mass for higher strength or higher rigidity and it is not required to form a complicated hydraulic circuit configuration by adding a third electromagnetic valve and a restrictor.

According to the fifth aspect of the invention, the hydraulic control device of a continuously variable transmission for a vehicle comprises the forward clutch engaged during forward running of the vehicle to transmit power output from the power source for running to the drive wheels, and the clutch pressure adjusting electromagnetic valve of normally-closed type using the modulator pressure as a source pressure for adjusting the clutch pressure supplied to the forward clutch, (k) the failsafe valve supplies the clutch pressure output from the clutch pressure adjusting electromagnetic valve to the forward clutch at the normal position and supplies the modulator pressure output from the modulator valve to the forward clutch instead of the clutch pressure at the failure position and, therefore, the crutch pressure adjusting electromagnetic valve becomes inoperable and the forward clutch is no longer supplied with the clutch pressure at the time of failure; however, since the modulator pressure is output from the modulator valve actuated by using the hydraulic source oil pressure as the source pressure even at the time of failure and is supplied to the forward clutch instead of the clutch pressure, the forward running can be performed even at the time of failure.

DESCRIPTION OF THE PREFERRED EMBODIMENTS

Examples of the present invention will now be described in detail with reference to the drawings.

Example 1

Figure 1:
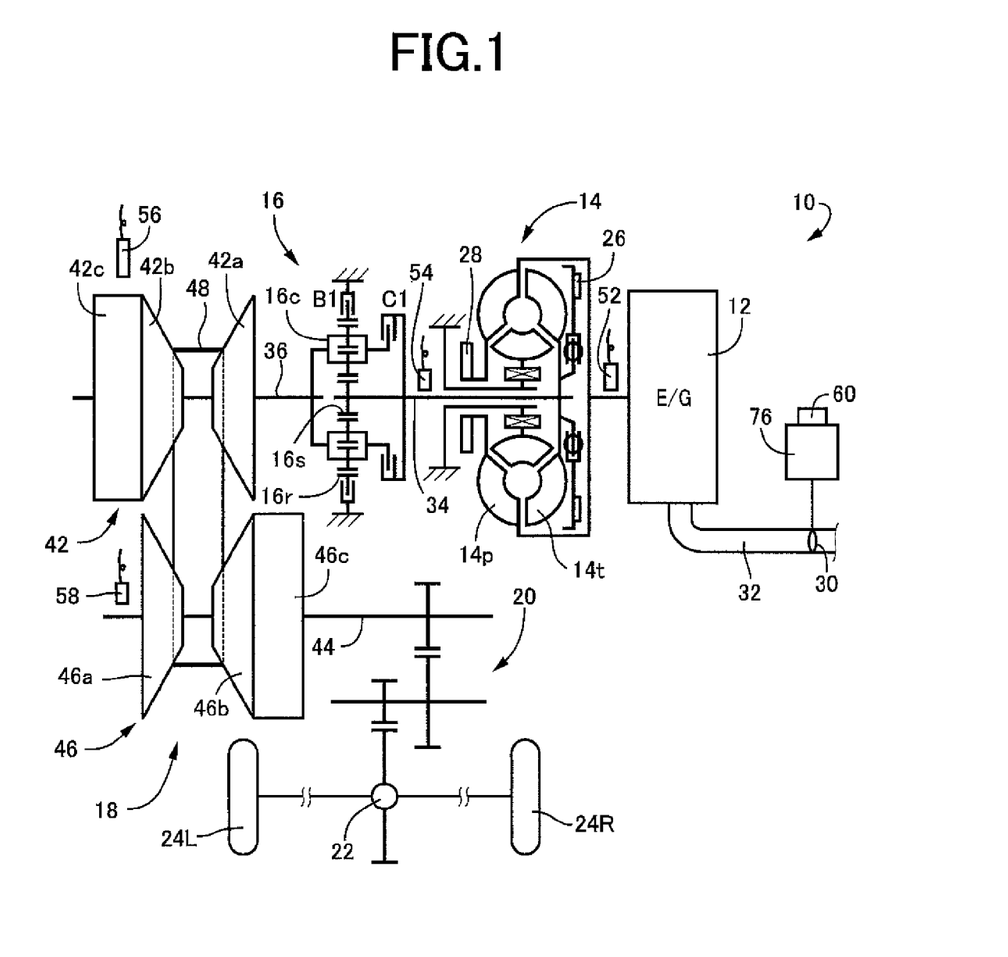
FIG. 1 is a schematic for explaining a configuration of a continuously variable transmission for a vehicle to which the present invention is applied.

FIG. 1 is a schematic for explaining a configuration of a vehicle drive device 10 to which the present invention is applied. The vehicle drive device 10 is preferably employed in an FF (front-engine front-drive) vehicle and includes an engine 12 as a power source for running. The output of the engine 12 made up of an internal combustion engine is transmitted from a torque converter 14 acting as a fluid power transmission device through a forward/reverse switching device 16, a belt-type continuously variable transmission 18 for a vehicle (CVT, hereinafter referred to as the "continuously variable transmission 18"), and a reduction gear device 20 to a differential gear device 22 and is distributed to left and right drive wheels 24L, 24R.

The torque converter 14 includes a pump impeller 14p coupled to a crankshaft of the engine 12 and a turbine impeller 14t coupled to the forward/reverse switching device 16 via a turbine shaft 34 and transmits power via fluid. A lockup clutch 26 is disposed between the pump impeller 14p and the turbine impeller 14t and is engaged or released when oil pressure supply to an engagement-side oil chamber and a release-side oil chamber is switched by a lockup control valve (L/C control valve) etc., (not shown) in a hydraulic control circuit 100 (see FIGS. 2 and 3), and when the lockup clutch 26 is completely engaged, the pump impeller 14p and the turbine impeller 14t are integrally rotated. The pump impeller 14p is coupled to a mechanical oil pump 28 generating an oil pressure for providing shift control of the continuously variable transmission 18, generating a belt clamping pressure, controlling engagement/release of the lockup clutch 26, or supplying a lubricating oil to the portions.

The forward/reverse switching device 16 is mainly made up of a double pinion type planetary gear device with the turbine shaft 34 of the torque converter 14 integrally coupled to a sun gear 16s and an input shaft 36 of the continuously variable transmission 18 integrally coupled to a carrier 16c while the carrier 16c and the sun gear 16s are selectively coupled via a forward clutch C1, and a ring gear 16r is selectively fixed to a housing via a reverse brake B1. The forward clutch C1 and the reverse brake B1 correspond to a connecting/disconnecting device and are both hydraulic friction engagement devices frictionally engaged by hydraulic cylinders.

When the forward clutch C1 is engaged and the reverse brake B1 is released, the forward/reverse switching device 16 is put into an integrally rotating state in which the sun gear 16s, the carrier 16c, and the ring gear 16r are integrally rotated, and the turbine shaft 34 is directly coupled to the input shaft 36 to establish (achieve) a forward power transmission path, thereby transmitting a forward direction drive power toward the continuously variable transmission 18. When the reverse brake B1 is engaged and the forward clutch C1 is released, a reverse power transmission path is established (achieved) and the input shaft 36 is rotated in the reverse direction relative to the turbine shaft 34, thereby transmitting a reverse direction drive power toward the continuously variable transmission 18. When both the forward clutch C1 and the reverse brake B1 are released, the forward/reverse switching device 16 is put into neutral (interrupted state) in which the power transmission is interrupted.

The continuously variable transmission 18 includes a driving-side pulley (primary sheave) 42 that is an input-side member disposed on the input shaft 36 and that has a variable effective diameter (belt winding diameter), i.e., a variable groove width, a driven-side pulley (secondary sheave) 46 that is an output-side member disposed on an output shaft 44 and that has a variable effective diameter (belt winding diameter), i.e., a variable groove width, and a transmission belt 48 wound around the pulleys 42, 46, and the power is transmitted through a frictional force between the pulleys 42, 46 and the transmission belt 48.

A pair of the driving-side pulley 42 and the driven-side pulley 46 includes a driving-side fixed rotating body (driving-side fixed rotating sheave) 42a and a driven-side fixed rotating body (driven-side fixed rotating sheave) 46a fixed to the input shaft 36 and the output shaft 44, respectively, a driving-side movable rotating body (driving-side movable rotating sheave) 42b and a driven-side movable rotating body (driven-side movable rotating sheave) 46b disposed relatively non-rotatably around the axis and movably in the axial direction relative to the input shaft 36 and the output shaft 44, a driving-side hydraulic cylinder (primary-pulley-side hydraulic cylinder) 42c as a driving-side hydraulic actuator applying a thrust force changing a V-groove width between the driving-side fixed rotating body 42a and the driving-side movable rotating body 42b, and a driven-side hydraulic cylinder (secondary-pulley-side hydraulic cylinder) 46c as a driven-side hydraulic actuator applying a thrust force changing a V-groove width between the driven-side fixed rotating body 46a and the driven-side movable rotating body 46b. When a primary oil pressure $P_{IN}$ supplied to the driving-side hydraulic cylinder 42c is controlled by the hydraulic control circuit 100 to control a supply/discharge flow rate of a hydraulic oil to the driving-side hydraulic cylinder 42c, the V-groove widths of the both pulleys 42, 46 are varied to change the winding diameter (effective diameter) of the transmission belt 48, so that a gear ratio γ (=input-shaft rotation speed Nin/output-shaft rotation speed Nout) is continuously varied. An oil pressure (secondary oil pressure $P_{OUT}$) of the driven-side hydraulic cylinder 46c is adjusted and controlled by the hydraulic control circuit 100 to control the belt clamping pressure so as not to cause a slip of the transmission belt 48.

Figure 2:
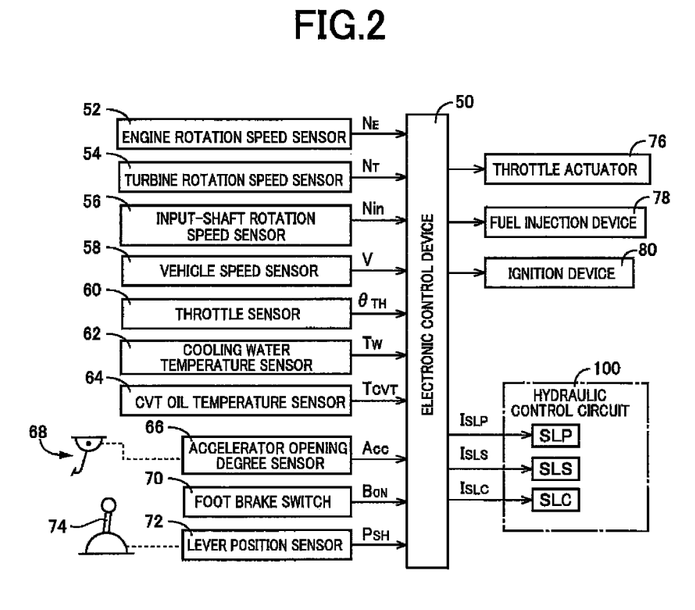
FIG. 2 is a block diagram for explaining a main portion of a control system provided in the vehicle for controlling the continuously variable transmission of FIG. 1.

FIG. 2 is a block diagram for explaining a main portion of a control system included in the vehicle drive device 10 of FIG. 1. An electronic control device 50 serves as a hydraulic control device of the continuously variable transmission 18, includes, for example, a so-called microcomputer having a CPU, a RAM, a ROM, an I/O interface, etc., and the CPU executes a signal process in accordance with a program stored in advance in the ROM, while utilizing a temporary storage function of the RAM, and provides the output control of the engine 12, the gear ratio control and the belt clamping pressure control of the continuously variable transmission 18, torque capacity control of the lockup clutch 26, etc. The electronic control device 50 can be configured separately for each of the engine control, the shift control of the continuously variable transmission 18, the hydraulic control of the lockup clutch 26, etc., as needed.

The electronic control device 50 is supplied with a signal indicative of a rotation speed (engine rotation speed) NE of the engine 12 detected by an engine rotation speed sensor 52; a signal indicative of a rotation speed (turbine rotation speed) $N_T$ of the turbine shaft 34 detected by a turbine rotation speed sensor 54; a signal indicative of a rotation speed (input-shaft rotation speed) Nin of the input shaft 36 that is an input rotation speed of the continuously variable transmission 18 detected by an input-shaft rotation speed sensor 56; a signal indicative of a rotation speed (output-shaft rotation speed) Nout of the output shaft 44 that is an output rotation speed of the continuously variable transmission 18, i.e., a rotation speed corresponding to a vehicle speed V, detected by a vehicle speed sensor 58; a throttle valve opening degree signal indicative of a throttle valve opening degree $\theta_{TH}$ of an electronic throttle valve 30 included in an intake pipe 32 (see FIG. 1) of the engine 12 detected by a throttle sensor 60; a signal indicative of a cooling water temperature Tw of the engine 12 detected by a cooling water temperature sensor 62; a signal indicative of a hydraulic oil temperature (oil temperature) $T_{CVT}$ of the continuously variable transmission 18 etc., detected by a CVT oil temperature sensor 64; an accelerator opening degree signal indicative of an accelerator opening degree Ace that is an operation amount of an accelerator pedal 68 detected by an accelerator opening degree sensor 66; a brake operation signal indicative of the presence of operation $B_{ON}$ of a foot brake that is a service brake detected by a foot brake switch 70; an operation position signal indicative of a lever position (operation position) $P_{SH}$ of a shift lever 74 detected by a lever position sensor 72, etc.

The shift lever 74 is disposed near a driver's seat, for example, and is manually operated to one of five lever positions "P," "R," "N," "D," and "L" arranged in order. The "P" position is a parking position for achieving a neutral state in which the power transmission is interrupted in the vehicle drive device 10 and for mechanically preventing (locking) the rotation of the output shaft 44 by a mechanical parking mechanism; the "R" position is a backward running position for reversing the rotation direction of the output shaft 44; the "N" position is a neutral position for achieving the neutral state in which the power transmission of the vehicle drive device 10 is interrupted; the "D" position is a forward running position for establishing an automatic shift mode in a shift range allowing the continuously variable transmission 18 to make a shift so as to provide automatic shift control; and the "L" position is an engine brake position allowing application of a strong engine brake.

On the other hand, for the output control of the engine 12, the electronic control device 50 outputs, for example, a throttle signal for driving a throttle actuator 76 for controlling opening/closing of the electronic throttle valve 30, an injection signal for controlling an amount of fuel injected from a fuel injection device 78, an ignition timing signal for controlling the timing of ignition of the engine 12 by an ignition device 80, etc. The electronic control device 50 also outputs a drive signal $I_{SLP}$ for actuating a primary oil pressure control valve PSCV controlling the primary oil pressure $P_{IN}$ associated with the gear ratio γ of the continuously variable transmission 18, a drive signal $I_{SLS}$ for actuating a secondary oil pressure control valve SSCV controlling a secondary oil pressure $P_{OUT}$ associated with the belt clamping pressure, and a drive signal $I_{SLC}$ for operating a linear solenoid valve SLC acting as a normally-closed clutch pressure adjusting electromagnetic valve for a clutch pressure $P_{C1}$ of the forward clutch C1. For controlling a brake pressure of the reverse brake B1 and a clutch pressure of the lockup clutch 26, the electronic control device 50 outputs a brake pressure control signal and a lockup clutch pressure control signal to a linear solenoid valve for the reverse brake B1 and a lockup clutch control valve not depicted.

Figure 3:
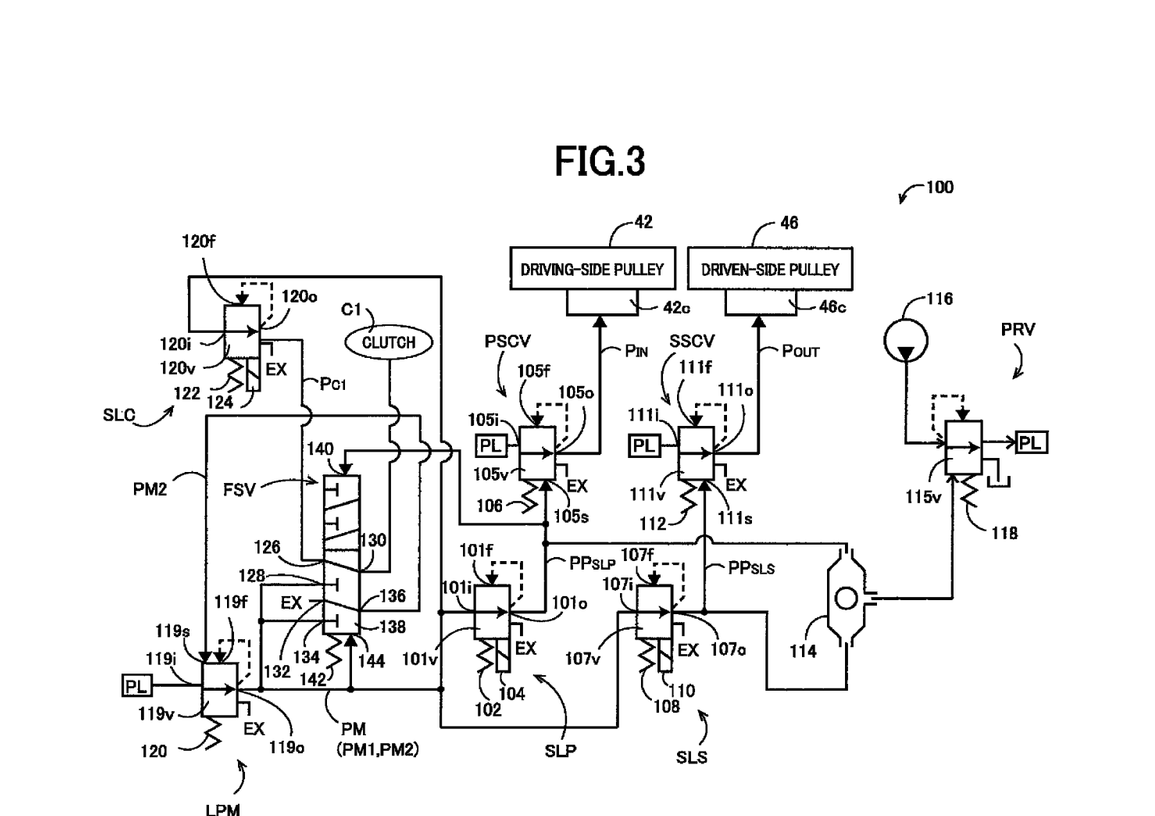
FIG. 3 is a hydraulic circuit diagram of a main portion related to hydraulic control of a driving-side hydraulic actuator and a driven-side hydraulic actuator of the continuous variable transmission and a forward clutch of a hydraulic control circuit of FIG. 2.

FIG. 3 is a hydraulic circuit diagram of a main portion related to the gear ratio control, the belt clamping pressure control, and the forward clutch pressure control of the continuously variable transmission 18 in the hydraulic control circuit 100, using substantially the same hydraulic display symbols as those used in JIS B 0125. In FIG. 3, a linear solenoid valve SLP has an input port 101*i* supplied with a modulator pressure PM that is a source pressure, an output port 101*o* outputting a control pressure (pilot pressure) $PP_{SLP}$, a feedback port 101*f* supplied with the control pressure $PP_{SLP}$, and a drain port EX, as well as a spool valve piece 101*v* switching the input port 101*i* to the output port 101*o* or the drain port EX, a spring 102 urging the spool valve piece 101*v* in a valve opening direction, and a linear solenoid 104 supplied with the drive signal $I_{SLP}$ from the electronic control device 50, and outputs the control oil pressure (pilot pressure) $PP_{SLP}$ at a magnitude corresponding to the drive signal $I_{SLP}$ from the electronic control device 50 by using the modulator pressure PM as the source pressure. Since the spool valve piece 101*v* is actuated to a position of equilibrium among a thrust force in a valve closing direction based on the control oil pressure $PP_{SLP}$, a thrust force in the valve opening direction based on the spring 102, and a thrust force in the valve opening direction based on the linear solenoid 104 so as to adjust the control oil pressure $PP_{SLP}$ continuously varying depending on a magnitude corresponding to the drive signal $I_{SLP}$, the linear solenoid valve SLP acts as a normally-opened driving-side control oil pressure adjusting electromagnetic valve. The valve opening direction is a direction toward a position of opening between the input port 101*i* and the output port 101*o* and the valve closing direction is a direction toward a position of closing between the input port 101*i* and the output port 101*o*.

The primary oil pressure control valve PSCV has an input port 105*i* supplied with a line pressure PL that is a source pressure, an output port 105*o* outputting the primary oil pressure $P_{IN}$, a feedback port 105*f* supplied with the primary oil pressure $P_{IN}$, a control pressure port 105*s* supplied with the control pressure $PP_{SLP}$, and a drain port EX, as well as a spool valve piece 105*v* switching the input port 105*i* to the output port 105*o* or the drain port EX, and a spring 106 urging the spool valve piece 105*v* in a valve opening direction, and outputs the primary oil pressure $P_{IN}$ at a magnitude corresponding to the control oil pressure $PP_{SLP}$ by using the line pressure PL as the source pressure. Since the spool valve piece 105*v* is actuated to a position of equilibrium among a thrust force in a valve closing direction based on the primary oil pressure $P_{IN}$, a thrust force in the valve opening direction based on the spring 106, and a thrust force in the valve opening direction based on the control oil pressure $PP_{SLP}$ so as to adjust the primary oil pressure $P_{IN}$ continuously varying depending on the control oil pressure $PP_{SLP}$, the primary oil pressure control valve PSCV is a mechanically-actuated pressure adjusting valve acting as a normally-opened driving-side hydraulic actuator control valve. The valve opening direction is a direction toward a position of opening between the input port 105*i* and the output port 105*o* and the valve closing direction is a direction toward a position of closing between the input port 105*i* and the output port 105*o*.

A linear solenoid valve SLS has an input port 107*i* supplied with the modulator pressure PM that is a source pressure, an output port 107*o* outputting a control pressure (pilot pressure) $PP_{SLS}$, a feedback port 107*f* supplied with the control pressure $PP_{SLS}$, and a drain port EX, as well as a spool valve piece 107*v* switching the input port 107*i* to the output port 107*o* or the drain port EX, a spring 108 urging the spool valve piece 107*v* in a valve opening direction, and a linear solenoid 110 supplied with the drive signal $I_{SLS}$ from the electronic control device 50, and outputs the control oil pressure (pilot pressure) $PP_{SLS}$ at a magnitude corresponding to the drive signal $I_{SLS}$ from the electronic control device 50 by using the modulator pressure PM as the source pressure. Since the spool valve piece 107*v* is actuated to a position of equilibrium among a thrust force in a valve closing direction based on the control oil pressure $PP_{SLS}$, a thrust force in the valve opening direction based on the spring 108, and a thrust force in the valve opening direction based on the linear solenoid 110 so as to adjust the control oil pressure $PP_{SLS}$ continuously varying depending on a magnitude corresponding to the drive signal $I_{SLS}$, the linear solenoid valve SLS acts as a normally-opened driving-side control oil pressure adjusting electromagnetic valve. The valve opening direction is a direction toward a position of opening between the input port 107*i* and the output port 107*o* and the valve closing direction is a direction toward a position of closing between the input port 107*i* and the output port 107*o*.

The secondary oil pressure control valve SSCV has an input port 111*i* supplied with the line pressure PL that is a source pressure, an output port 111*o* outputting the secondary oil pressure $P_{OUT}$, a feedback port 111*f* supplied with the secondary oil pressure $P_{OUT}$, a control pressure port 111*s* supplied with the control oil pressure $PP_{SLS}$, and a drain port EX, as well as a spool valve piece 111*v* switching the input port 111*i* to the output port 111*o* or the drain port EX, and a spring 112 urging the spool valve piece 111*v* in a valve opening direction, and outputs the secondary oil pressure $P_{OUT}$ at a magnitude corresponding to the control oil pressure $PP_{SLS}$ by using the line pressure PL as the source pressure. Since the spool valve piece 111*v* is actuated to a position of equilibrium among a thrust force in a valve closing direction based on the secondary oil pressure $P_{OUT}$, a thrust force in the valve opening direction based on the spring 112, and a thrust force in the valve opening direction based on the control oil pressure $PP_{SLS}$ so as to adjust the secondary oil pressure $P_{OUT}$ continuously varying depending on the control oil pressure $PP_{SLS}$, the secondary oil pressure control valve SSCV is a mechanically-actuated pressure adjusting valve acting as a normally-opened driven-side hydraulic actuator control valve. The valve opening direction is a direction toward a position of opening between the input port 111*i* and the output port 111*o* and the valve closing direction is a direction toward a position of closing between the input port 111*i* and the output port 111*o*.

The hydraulic control circuit 100 has a shuttle valve 114 and a primary regulator PRV provided as the hydraulic source, and the shuttle valve 114 outputs a larger control oil pressure between the control oil pressure $PP_{SLP}$ and the control oil pressure $PP_{SLS}$, and the primary regulator PRV uses a discharge pressure from a hydraulic pump 116 rotationally driven by the engine 12 as a source pressure for adjusting a line oil pressure PL higher by a predetermined pressure than the larger oil pressure between the primary oil pressure $P_{IN}$ and the secondary oil pressure $P_{OUT}$ based on the control oil pressure output from the shuttle valve 114. The primary regulator PRV is a relief type pressure adjusting valve adjusting an amount of hydraulic oil discharged from the hydraulic pump 116 and released to a drain, so as to adjust an oil pressure in a line oil passage guiding the discharge pressure of the hydraulic pump 116 to the line oil pressure PL. The primary regulator PRV has a spool valve piece 115v actuated to a position of equilibrium among a thrust force in the valve opening direction based on the line oil pressure PL, a thrust force in the valve closing direction based on a spring 118, and a thrust force in the valve closing direction based on a larger control oil pressure between the control oil pressure $PP_{SLP}$ and the control oil pressure $PP_{SLS}$, and outputs the line oil pressure PL higher by a predetermined pressure than the primary oil pressure $P_{IN}$ and the secondary oil pressure $P_{OUT}$ as a hydraulic source oil pressure of the hydraulic control circuit 100.

It is noted that the primary oil pressure $P_{IN}$ and the secondary oil pressure $P_{OUT}$ may be input to the shuttle valve 114 so as to adjust and output the line oil pressure PL higher by a predetermined pressure than larger oil pressure between the primary oil pressure $P_{IN}$ and the secondary oil pressure $P_{OUT}$ from the primary regulator PRV. Alternatively, a required load pressure representative of the accelerator opening degree or the throttle valve opening degree is supplied to the primary regulator PRV so as to adjust and output the line oil pressure PL increasing according to the required load pressure.

A modulator valve LPM has an input port 119i supplied with the line oil pressure PL that is a source pressure, an output port 119o outputting the modulator pressure PM, a feedback port 119f supplied with the modulator pressure PM, an output pressure switching port 119s receiving an output switching pressure PS, and a drain port EX, as well as a spool valve piece 119v switching the input port 119i to the output port 119o or the drain port EX, and is a mechanically-actuated pressure adjusting valve outputting the constant modulator pressure PM regardless of variations of the line oil pressure PL. The output pressure switching port 119s is disposed on the same side as the feedback port 119f, i.e., the side of generating a thrust force in a valve closing direction. The spool valve piece 119v is actuated to a position of equilibrium among a thrust force in the valve closing direction based on the modulator pressure PM, a thrust force in the valve closing direction based on the output switching pressure, and a thrust force in the valve opening direction based on an urging force of a spring 120. The valve opening direction is a direction toward a position of opening between the input port 119i and the output port 119o and the valve closing direction is a direction toward a position of closing between the input port 119i and the output port 119o. As a result, the modulator valve LPM outputs the constant modulator pressure PM, i.e., a first modulator pressure PM1, in a normal state in which the output switching pressure PS is not supplied, and outputs a constant second modulator pressure PM2 lower than the first modulator pressure PM1 in a failure state in which the output switching pressure PS is supplied.

The linear solenoid valve SLC has an input port 120i supplied with the line pressure PL that is a source pressure, an output port 120o outputting the clutch oil pressure $P_{C1}$, a feedback port 120f supplied with the clutch oil pressure $P_{C1}$, and a drain port EX, as well as a spool valve piece 120v switching the input port 120i to the output port 120o or the drain port EX, a spring 122 urging the spool valve piece 120v in a valve opening direction, and a linear solenoid 124 supplied with the drive signal $I_{SLC}$ from the electronic control device 50, and outputs the clutch oil pressure $P_{C1}$ at a magnitude corresponding to the drive signal $I_{SLC}$ from the electronic control device 50 by using the line pressure PL as the source pressure through a failsafe valve FSV to the forward clutch C1. Since the spool valve piece 120v is actuated to a position of equilibrium among a thrust force in a valve closing direction based on the clutch oil pressure $P_{C1}$, a thrust force in the valve opening direction based on the spring 122, and a thrust force in the valve opening direction based on the linear solenoid 124 so as to adjust the clutch oil pressure $P_{C1}$ continuously varying depending on the drive signal $I_{SLC}$, the linear solenoid valve SLC is a mechanically-actuated pressure adjusting valve acting as a normally-opened driving-side hydraulic actuator control valve. The valve opening direction is a direction toward a position of opening between the input port 120i and the output port 120o and the valve closing direction is a direction toward a position of closing between the input port 120i and the output port 120o.

The failsafe valve FSV has a clutch oil pressure input port 126 to which the clutch oil pressure $P_{C1}$ output from the linear solenoid valve SLC is input; a first modulator pressure input port 128 to which the modulator pressure PM output from the modulator valve LPM is input; a first output port 130 allowed to alternatively communicate with the clutch oil pressure input port 126 and the first modulator pressure input port 128; a drain port 132; a second modulator pressure input port 134 to which the modulator pressure PM output from the modulator valve LPM is input; a second output port 136 allowed to alternatively communicate with the drain port 132 and the second modulator pressure input port 134; and a spool valve piece 138 moved between a normal position allowing the first output port 130 to communicate with the clutch oil pressure input port 126 and the second output port 136 to communicate with the drain port 132 and a failure position allowing the first output port 130 to communicate with the first modulator pressure input port 128 and the second output port 136 to communicate with the second modulator pressure input port 134, and is a two-position switching valve having the spool valve piece 138 switched between the normal state (position) and the failure state (position).

The failsafe valve FSV is provided with a switching pressure port 140 to which the control pressure $PP_{SLP}$ urging the spool valve piece 138 toward the failure position is supplied as a switching pressure, a spring 142 urging the spool valve piece 138 toward the normal position, and a modulator pressure port 144 receiving the modulator pressure PM urging the spool valve piece 138 toward the normal position. Therefore, the spool valve piece 138 is switched to either the failure position or the normal position depending on a relative magnitude relation between a thrust force FF toward the failure position based on the control pressure $PP_{SLP}$ and a thrust force FN toward the normal position based on the spring 142 and the modulator pressure PM. Therefore, the spool valve piece 138 is positioned at the normal position when the thrust force FN toward the normal position is larger than the thrust force FF toward the failure position (FF<FN), and is positioned at the failure position when the thrust force FF toward the failure position is larger than the thrust force FN toward the normal position (FF>FN). In this example, an urging force and a pressure receiving area of the spring 142 are set such that FF>FN is achieved when the control pressure $PP_{SLP}$ exceeds a maximum value of a variation range in a normal state and reaches a switching setting pressure set between the maximum value and an output pressure of the modulator valve LPM, for example, the second modulator pressure PM2, in a failure state in which the linear solenoid valve SLP and the linear solenoid valve SLS are both put into an OFF-state due to occurrence of a failure disabling the electric control to these valves, such as a failure of an electric power source for the hydraulic control, disconnection of a harness supplying drive signals from an electronic control device to the electromagnetic valves, or a failure of the electronic control device controlling the electromagnetic valves, while the engine 12 is operating and the hydraulic pump 116 is rotationally driven. The spring 142 and/or the modulator pressure port 144 may not necessarily be disposed in a range in which the switching operation can be performed.

In the hydraulic control circuit 100 of this example configured as described above, in a normal state without disconnection of a harness supplying drive signals to the electromagnetic valves, a failure of the electronic control device controlling the electromagnetic valves, etc., the clutch oil pressure $P_{C1}$ output from the linear solenoid valve SLC is supplied through the clutch oil pressure input port 126 and the first output port 130 of the failsafe valve FSV to the forward clutch C1. Since the failsafe valve FSV is closed between the second modulator pressure input port 134 and the second output port 136 and the modulator pressure PM acting as the output switching pressure PS is not supplied to the output pressure switching port 119s of the modulator valve LPM, the modulator valve LPM outputs the constant first modulator pressure PM1.

However, if the normal state turns to the failure state, the linear solenoid valve SLP is no longer supplied with the drive signal $I_{SLP}$ and is put into the opened state, and the control pressure $PP_{SLP}$ output from the linear solenoid valve SLP is set to the modulator pressure PM that is the source pressure thereof. The failsafe valve FSV is switched to the failure position. As a result, since the failsafe valve FSV is opened between the second modulator pressure input port 134 and the second output port 136 and the modulator pressure PM acting as the output switching pressure PS is supplied through the failsafe valve FSV to the output pressure switching port 119s of the modulator valve LPM, the modulator valve LPM outputs the second modulator pressure PM2 lower than the first modulator pressure PM1. As a result, even if the linear solenoid valve SLP and the linear solenoid valve SLS are put into the opened state in the failure state, since the source pressures thereof are set to the second modulator pressure PM2 lower than the preceding first modulator pressure PM1 and the second modulator pressure PM2 is supplied as the control pressure $PP_{SLP}$ and the control pressure $PP_{SLS}$ to the primary oil pressure control valve PSCV and the secondary oil pressure control valve SSCV, the driving-side pulley 42 and the driven-side pulley 46 are not increased in axial dimension and mass for higher strength or higher rigidity and, since only the failsafe valve FSV configured as a simple switching valve may be disposed according to this example, it is not required to form a complicated hydraulic circuit configuration by adding a third electromagnetic valve and a pressure reducing means as in the conventional techniques, and the hydraulic control circuit is simplified in configuration and made inexpensive.

Since the failsafe valve FSV is the switching valve having the switching pressure port 140 receiving as the switching pressure the control oil pressure $PP_{SLP}$ output from the linear solenoid valve SLP, and being switched from the normal position to the failure position based on the control oil pressure $PP_{SLP}$ received by the switching pressure port 140 exceeding a preset pressure value, the failsafe valve FSV can be switched from the normal position to the failure position without increasing circuit components such as an electromagnetic valve for switching to the failure position.

When the clutch oil pressure $P_{C1}$ output from the linear solenoid valve SLC is blocked by the failsafe valve FSV and is no longer supplied to the forward clutch C1, the second modulator pressure PM2 output from the modulator valve LPM is supplied to the forward clutch C1 instead, to ensure the forward running of the vehicle, i.e., the limp home running.

Example 2

Figure 4:
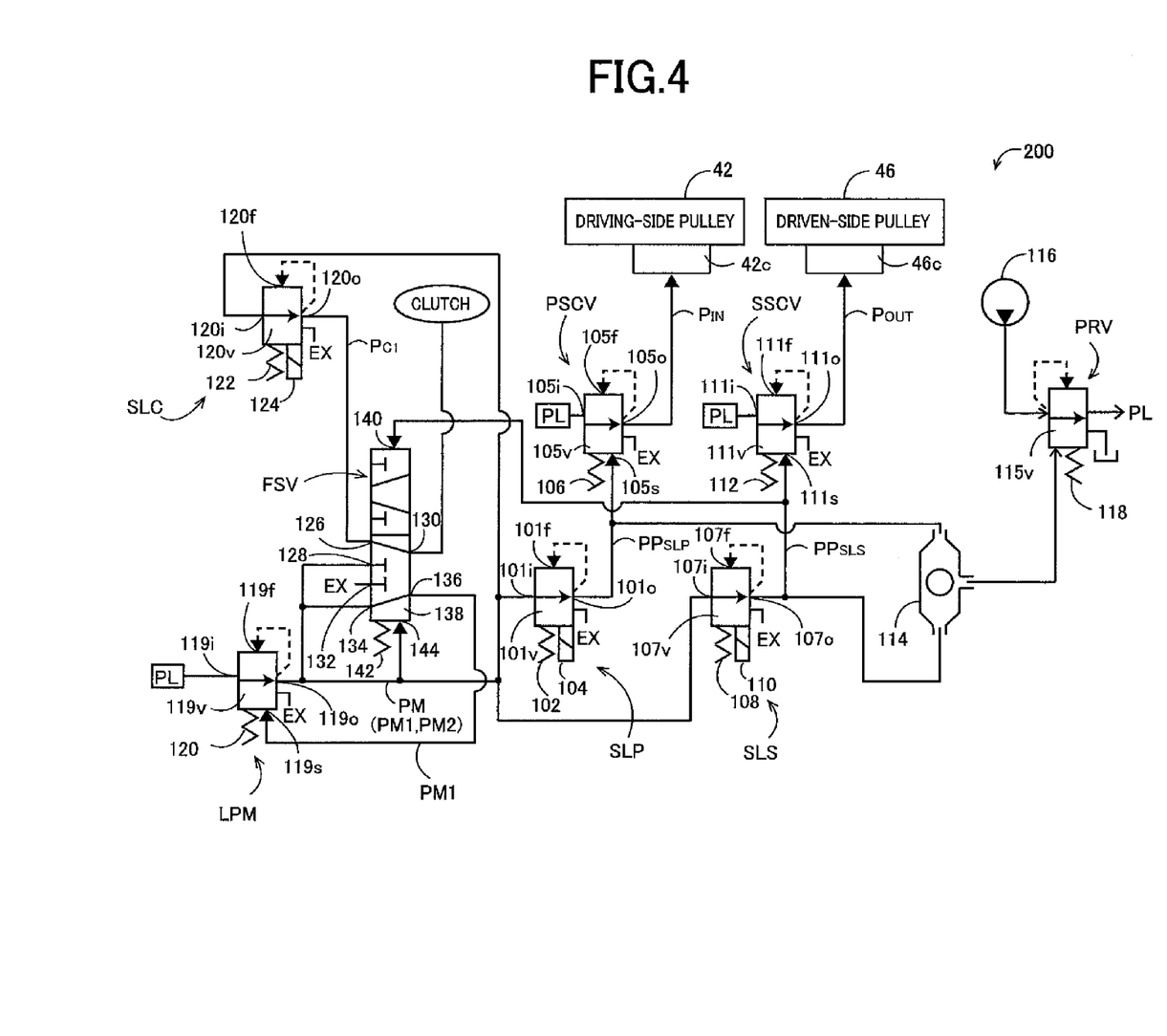
FIG. 4 is a hydraulic circuit diagram of a main portion related to hydraulic control of a driving-side hydraulic actuator and a driven-side hydraulic actuator of the continuous variable transmission and a forward clutch of a hydraulic control circuit to which another example of the present invention is applied.

FIG. 4 depicts a hydraulic control circuit 200 of another example of the present invention. The hydraulic control circuit 200 of the example is configured in the same way as the hydraulic control circuit 100 described above except differences in the configurations of the failsafe valve FSV and the modulator valve LPM and, therefore, the common portions are denoted by the same reference numerals and will not be described.

The modulator valve LPM of FIG. 4 has the output pressure switching port 119s disposed on the side opposite to the feedback port 119f, i.e., the side of generating a thrust force in a valve opening direction for the spool valve piece 119v. As a result, the modulator valve LPM outputs the constant modulator pressure PM, i.e., the first modulator pressure PM1, in a normal state in which the output switching pressure PS is supplied, and outputs the constant second modulator pressure PM2 lower than the first modulator pressure PM1 in a failure state in which the output switching pressure PS is drained without being supplied.

The control pressure $PP_{SLS}$ is supplied as the switching pressure to the switching pressure port 140 of the failsafe valve FSV. As a result, the failsafe valve FSV of this example has the spring 142 with the urging force and the pressure receiving area set such that when the control pressure $PP_{SLS}$ reaches the modulator pressure PM exceeding the variation range for the normal state in the failure state, the thrust force FF toward the failure position exceeds the thrust force FN toward the normal position (FF>FN).

In the failsafe valve FSV, contrary to the example described above, the second output port 136 is allowed to communicate with the second modulator pressure input port 134 to which the modulator pressure PM is input in the normal state, and is allowed to communicate with the drain port 132 in the failure state. As a result, to the output pressure switching port 119s of the modulator valve LPM, the modulator pressure PM acting as the output switching pressure PS is supplied to the second modulator pressure input port 134 in the normal state and, therefore, the first modulator pressure PM1 is output from the modulator valve LPM. In contrast, since the modulator pressure PM supplied as the output switching pressure PS is drained in the failure state, the second modulator pressure PM2 lower than the first modulator pressure PM1 is output from the modulator valve LPM.

According to the hydraulic control circuit 200 of this example, when the normal state turns to the failure state and the failsafe valve FSV is switched from the normal position to the failure position, the second modulator pressure PM2 lower than the first modulator pressure PM1 is output from the modulator valve LPM. As a result, even if the linear solenoid valve SLP and the linear solenoid valve SLS are put into the opened state in the failure state, since the source pressures thereof are set to the second modulator pressure PM2 lower than the preceding first modulator pressure PM1 and the second modulator pressure PM2 is supplied as the control pressure $PP_{SLP}$ and the control pressure $PP_{SLS}$ to the primary oil pressure control valve PSCV and the secondary oil pressure control valve SSCV, the driving-side pulley 42 and the driven-side pulley 46 are not increased in axial dimension and mass for higher strength or higher rigidity, and it is not required to form a complicated hydraulic circuit configuration by adding a third electromagnetic valve and a restrictor as in the conventional techniques.

Since the failsafe valve FSV is the switching valve having the switching pressure port 140 receiving as the switching pressure the control oil pressure $PP_{SLS}$ output from the linear solenoid valve SLS, and being switched from the normal position to the failure position based on the control oil pressure $PP_{SLS}$ received by the switching pressure port 140 exceeding a preset pressure value, the failsafe valve FSV can be switched from the normal position to the failure position without increasing circuit components such as an electromagnetic valve for switching to the failure position.

In this example, too, when the clutch oil pressure $P_{C1}$ output from the linear solenoid valve SLC is blocked by the failsafe valve FSV and is no longer supplied to the forward clutch C1, the second modulator pressure PM2 output from the modulator valve LPM is supplied to the forward clutch C1 instead, to ensure the forward running of the vehicle.

Although the examples of the present invention have been described in detail with reference to the drawings, these examples are merely an embodiment and the present invention can be implemented in other forms.

For example, the linear solenoid valve SLP acting as the normally-opened driving-side control oil pressure adjusting electromagnetic valve of the examples described above outputs the control oil pressure (pilot pressure) $PP_{SLP}$ at a magnitude corresponding to the drive signal $I_{SLP}$ from the electronic control device 50 by using the modulator pressure PM as the source pressure. However, a restrictor communicating with a modulator pressure oil passage and a duty-driven normally-closed ON/OFF-type electromagnetic opening/closing valve draining a hydraulic oil downstream of the restrictor may be used for generating a control oil pressure (pilot pressure) $PP_{SLP}$ downstream of the restrictor by adjusting an amount of the drained hydraulic oil, so as to implement the normally-opened driving-side control oil pressure adjusting electromagnetic valve.

The linear solenoid valve SLS acting as the normally-opened driven-side control oil pressure adjusting electromagnetic valve of the examples described above outputs the control oil pressure (pilot pressure) $PP_{SLS}$ at a magnitude corresponding to the drive signal $I_{SLS}$ from the electronic control device 50 by using the modulator pressure PM as the source pressure. However, a restrictor communicating with a modulator pressure oil passage and a duty-driven normally-closed ON/OFF-type electromagnetic opening/closing valve draining a hydraulic oil downstream of the restrictor may be used for generating the control oil pressure (pilot pressure) $PP_{SLS}$ downstream of the restrictor by adjusting an amount of the drained hydraulic oil, so as to implement the normally-opened driven-side control oil pressure adjusting electromagnetic valve.

Although the failsafe valve FSV is switched from the normal position to the failure position when the control oil pressure $PP_{SLP}$ or the control oil pressure $PP_{SLS}$ exceeds the preset pressure value in the examples described above, the failsafe valve FSV may be switched from the normal position to the failure position when the control oil pressure $PP_{SLS}$ and the control oil pressure $PP_{SLP}$ exceed respective preset pressure values.

The failsafe valve FSV may be a switching valve receiving an output pressure of another normally-opened electromagnetic valve and switched from the normal position to the failure position based on the output pressure exceeding a preset pressure value. Basically, the failsafe valve FSV may be any switching valve switched from the normal position to the failure position at the time or failure when electromagnetic valves are all put into an OFF-state due to occurrence of a failure of an electric power source for hydraulic control, disconnection of a harness supplying a drive control signal from an electronic control device to the electromagnetic valves, or a failure of the electronic control device controlling the electromagnetic valves.

In the examples described above, internal combustion engines such as gasoline engines and diesel engines are widely used as the engine 12 acting as the power source for running. Additionally, an electric motor etc. may be used as the power source for running in addition to the engine 12. Alternatively, only the electric motor may be used as the power source for running.

The above description is merely an embodiment and the present invention may be implemented in variously modified and improved forms based on the knowledge of those skilled in the art.

REFERENCE SIGNS LIST

12: Engine (Drive source for running)
18: Continuously variable transmission (Continuously variable transmission for a vehicle)
24L, 24R: Drive wheels
42: Driving-side pulley
42c: Driving-side hydraulic cylinder (Driving-side hydraulic actuator)
46: Driven-side pulley
46c: Driven-side hydraulic cylinder (Driven-side hydraulic actuator)
48: Transmission belt
50: Electronic control device (Hydraulic control device)
100, 200: Hydraulic control circuit
140: Switching pressure port
C1: Forward clutch
FSV: Failsafe valve
LPM: Modulator valve
PL: Line pressure
PM1: First modulator pressure
PM2: Second modulator pressure
$P_{IN}$: Primary oil pressure
$P_{OUT}$: Secondary oil pressure
PSCV: Primary oil pressure control valve (Driving-side hydraulic actuator control valve)
SSCV: Secondary oil pressure control valve (Driven-side hydraulic actuator control valve)
SLP: Linear solenoid valve (Normally-opened driving-side control oil pressure adjusting electromagnetic valve)
SLS: Linear solenoid valve (Normally-opened driven-side control oil pressure adjusting electromagnetic valve)
SLC: Linear solenoid valve (Normally-closed clutch pressure adjusting electromagnetic valve)

What is claimed is:

1. A hydraulic control device of a continuously variable transmission for a vehicle including driving-side and driven-side pulleys disposed in a power transmission path between a power source for running and drive wheels, a belt wound around the both pulleys, a driving-side hydraulic actuator for changing a groove width of the driving-side pulley, and a driven-side hydraulic actuator for changing a groove width of the driven-side pulley, the hydraulic control device comprising: a modulator valve using an oil pressure from a hydraulic source as a source pressure for adjusting a modulator pressure; a driving-side hydraulic actuator control valve controlling a hydraulic oil supplied from the hydraulic source to the driving-side hydraulic actuator; a driving-side control oil pressure adjusting electromagnetic valve of normally-opened type using the modulator pressure as a source pressure for outputting a control oil pressure controlling the driving-side hydraulic actuator control valve; a driven-side hydraulic actuator control valve controlling a hydraulic oil supplied from the hydraulic source to the driven-side hydraulic actuator; and a driven-side control oil pressure adjusting electromagnetic valve of normally-opened type using the modulator pressure as a source pressure for outputting a control oil pressure controlling the driven-side hydraulic actuator control valve, the hydraulic control device including a failsafe valve switched from a normal position to a failure position based on an occurrence of a failure disabling electric control for the driving-side control oil pressure adjusting electromagnetic valve and the driven-side control oil pressure adjusting electromagnetic valve, the modulator valve making the modulator pressure lower than a value at the normal position based on an output switching pressure generated due to switching of the failsafe valve from the normal position to the failure position.

2. The hydraulic control device of a continuously variable transmission for a vehicle according to claim 1, wherein the failsafe valve is a switching valve having a switching pressure port receiving as a switching pressure the control oil pressure output from the driving-side control oil pressure adjusting electromagnetic valve or the control oil pressure output from the driven-side control oil pressure adjusting electromagnetic valve, and being switched from the normal position to the failure position based on the control oil pressure received with the switching pressure port exceeding a preset pressure value.

3. The hydraulic control device of a continuously variable transmission for a vehicle according to claim 1, wherein the modulator valve has an input port connected to the hydraulic source, an output port, and an output pressure switching port receiving an output switching pressure for switching an amplitude of an output pressure output from the output port, outputs a constant first modulator pressure regardless of variations in oil pressure of the hydraulic source when the output switching pressure is not supplied to the output pressure switching port, and outputs a constant second modulator pressure lower than the first modulator pressure regardless of variations in oil pressure of the hydraulic source when the output switching pressure is supplied to the output pressure switching port, and wherein when the failsafe valve is switched from the normal position to the failure position, the failsafe valve supplies as the output switching pressure the second modulator pressure output from the modulator valve to the output pressure switching port that has been drained.

4. The hydraulic control device of a continuously variable transmission for a vehicle according to claim 2, wherein the modulator valve has an input port connected to the hydraulic source, an output port, and an output pressure switching port receiving an output switching pressure for switching an amplitude of an output pressure output from the output port, outputs a constant first modulator pressure regardless of variations in oil pressure of the hydraulic source when the output switching pressure is not supplied to the output pressure switching port, and outputs a constant second modulator pressure lower than the first modulator pressure regardless of variations in oil pressure of the hydraulic source when the output switching pressure is supplied to the output pressure switching port, and wherein when the failsafe valve is switched from the normal position to the failure position, the failsafe valve supplies as the output switching pressure the second modulator pressure output from the modulator valve to the output pressure switching port that has been drained.

5. The hydraulic control device of a continuously variable transmission for a vehicle according to claim 1, wherein the modulator valve has an input port connected to the hydraulic source, an output port, and an output pressure switching port receiving an output switching pressure for switching an amplitude of a modulator pressure output from the output port, outputs a constant first modulator pressure regardless of variations in oil pressure of the hydraulic source when the output switching pressure is supplied to the output pressure switching port, and outputs a constant second modulator pressure lower than the first modulator pressure regardless of variations in oil pressure of the hydraulic source when the output switching pressure is not supplied to the output pressure switching port, and wherein when the failsafe valve is switched from the normal position to the failure position, the failsafe valve drains the first modulator pressure from the modulator valve that has been supplied to the output pressure switching port.

6. The hydraulic control device of a continuously variable transmission for a vehicle according to claim 2, wherein the modulator valve has an input port connected to the hydraulic source, an output port, and an output pressure switching port receiving an output switching pressure for switching an amplitude of a modulator pressure output from the output port, outputs a constant first modulator pressure regardless of variations in oil pressure of the hydraulic source when the output switching pressure is supplied to the output pressure switching port, and outputs a constant second modulator pressure lower than the first modulator pressure regardless of variations in oil pressure of the hydraulic source when the output switching pressure is not supplied to the output pressure switching port, and wherein when the failsafe valve is switched from the normal position to the failure position, the failsafe valve drains the first modulator pressure from the modulator valve that has been supplied to the output pressure switching port.

7. The hydraulic control device of a continuously variable transmission for a vehicle according to claim 1, further comprising a forward clutch engaged during forward running of the vehicle to transmit power output from the power source for running to the drive wheels, and a clutch pressure adjusting electromagnetic valve of normally-closed type using the modulator pressure as a source pressure for adjusting a clutch pressure supplied to the forward clutch, wherein the failsafe valve supplies the clutch pressure output from the clutch pressure adjusting electromagnetic valve to the forward clutch at the normal position and supplies the modulator pressure output from the modulator valve to the forward clutch instead of the clutch pressure at the failure position.

8. The hydraulic control device of a continuously variable transmission for a vehicle according to claim 2, further comprising a forward clutch engaged during forward running of the vehicle to transmit power output from the power source for running to the drive wheels, and a clutch pressure adjusting electromagnetic valve of normally-closed type using the modulator pressure as a source pressure for adjusting a clutch pressure supplied to the forward clutch, wherein the failsafe valve supplies the clutch pressure output from the clutch pressure adjusting electromagnetic valve to the forward clutch at the normal position and supplies the modulator pressure output from the modulator valve to the forward clutch instead of the clutch pressure at the failure position.

9. The hydraulic control device of a continuously variable transmission for a vehicle according to claim 3, further comprising a forward clutch engaged during forward running of the vehicle to transmit power output from the power source for running to the drive wheels, and a clutch pressure adjusting electromagnetic valve of normally-closed type using the modulator pressure as a source pressure for adjusting a clutch pressure supplied to the forward clutch, wherein the failsafe valve supplies the clutch pressure output from the clutch pressure adjusting electromagnetic valve to the forward clutch at the normal position and supplies the modulator pressure output from the modulator valve to the forward clutch instead of the clutch pressure at the failure position.

10. The hydraulic control device of a continuously variable transmission for a vehicle according to claim 4, further comprising a forward clutch engaged during forward running of the vehicle to transmit power output from the power source for running to the drive wheels, and a clutch pressure adjusting electromagnetic valve of normally-closed type using the modulator pressure as a source pressure for adjusting a clutch pressure supplied to the forward clutch, wherein the failsafe valve supplies the clutch pressure output from the clutch pressure adjusting electromagnetic valve to the forward clutch at the normal position and supplies the modulator pressure output from the modulator valve to the forward clutch instead of the clutch pressure at the failure position.

11. The hydraulic control device of a continuously variable transmission for a vehicle according to claim 5, further comprising a forward clutch engaged during forward running of the vehicle to transmit power output from the power source for running to the drive wheels, and a clutch pressure adjusting electromagnetic valve of normally-closed type using the modulator pressure as a source pressure for adjusting a clutch pressure supplied to the forward clutch, wherein the failsafe valve supplies the clutch pressure output from the clutch pressure adjusting electromagnetic valve to the forward clutch at the normal position and supplies the modulator pressure output from the modulator valve to the forward clutch instead of the clutch pressure at the failure position.

12. The hydraulic control device of a continuously variable transmission for a vehicle according to claim 6, further comprising a forward clutch engaged during forward running of the vehicle to transmit power output from the power source for running to the drive wheels, and a clutch pressure adjusting electromagnetic valve of normally-closed type using the modulator pressure as a source pressure for adjusting a clutch pressure supplied to the forward clutch, wherein the failsafe valve supplies the clutch pressure output from the clutch pressure adjusting electromagnetic valve to the forward clutch at the normal position and supplies the modulator pressure output from the modulator valve to the forward clutch instead of the clutch pressure at the failure position.

\* \* \* \* \*